United States Patent [19]

Cantarinhas

[11] Patent Number: 4,725,049

[45] Date of Patent: Feb. 16, 1988

[54] INVERSE WELDING CLAMP

[76] Inventor: Jose Cantarinhas, 38 Marne St., Newark, N.J. 07105

[21] Appl. No.: 23,833

[22] Filed: Mar. 9, 1987

[51] Int. Cl.⁴ .............................................. B25B 7/02
[52] U.S. Cl. .......................................... 269/6; 81/420;
269/228; 269/269; 269/87; 29/268
[58] Field of Search ...................... 29/268; 269/6, 269, 269/904, 228, 37, 87; 81/419, 420, 300, 303, 304, 311

[56] References Cited

U.S. PATENT DOCUMENTS

| | | |
|---|---|---|
| 319,226 | 6/1885 | Goff . |
| 630,387 | 8/1899 | Maxwell .............................. 81/300 |
| 1,045,803 | 12/1912 | Allen ................................... 81/300 |
| 1,341,712 | 6/1920 | Gell . |
| 2,366,312 | 1/1945 | Brintnall . |
| 2,731,932 | 1/1956 | Petersen . |
| 2,815,728 | 12/1957 | Fenimore . |
| 3,314,312 | 4/1967 | Schmidt ............................. 81/420 |
| 3,572,187 | 3/1971 | Glassburn . |
| 3,617,044 | 11/1971 | Strange .............................. 81/420 |
| 4,386,543 | 6/1983 | Walker ............................... 81/420 |
| 4,505,011 | 3/1985 | Dupuy ................................ 81/420 |

Primary Examiner—Robert C. Watson
Attorney, Agent, or Firm—Elliot M. Olstein; Raymond J. Lillie

[57] ABSTRACT

A clamp comprising a plurality of pivotally related members and a plurality of jaw elements, each secured at the yoke portion thereof to a pivotally related member. From the free ends of each of the leg portions of the jaw element immediately below the uppermost jaw element are flat extension members, each extension member having two flat portions. The first portions extend upwardly from the jaw element immediately below the uppermost jaw element to a location above the uppermost jaw element. The second portion is essentially perpendicular to the first portion and located above the uppermost jaw element and aligned with the uppermost jaw element for clamping engagement with a work piece. This clamp is particularly useful for metal constructions which have a lip.

6 Claims, 9 Drawing Figures

FIG. 6
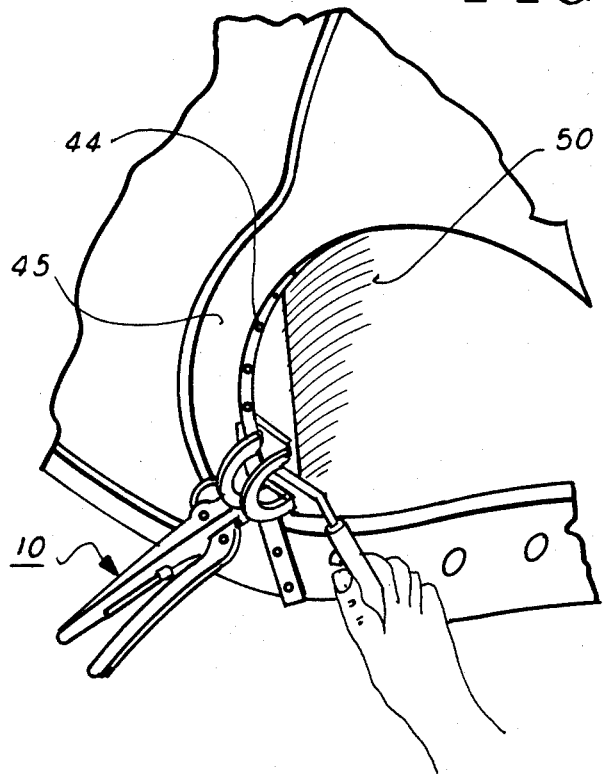
FIG. 8
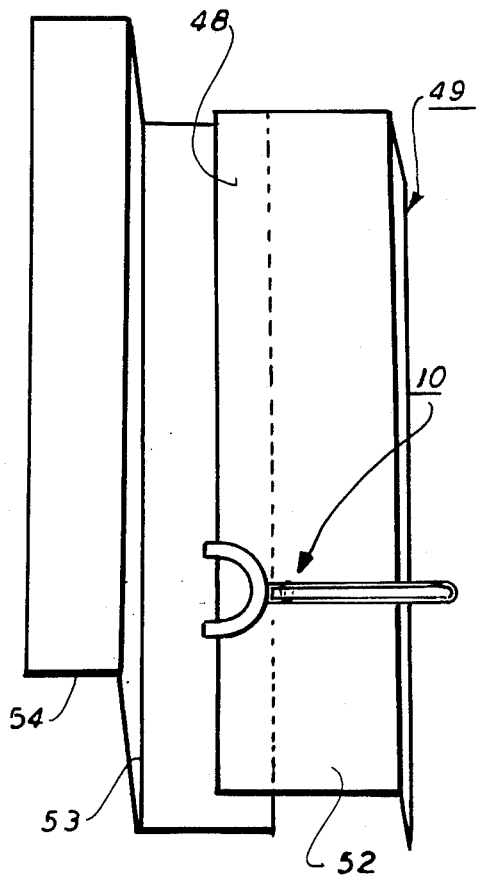
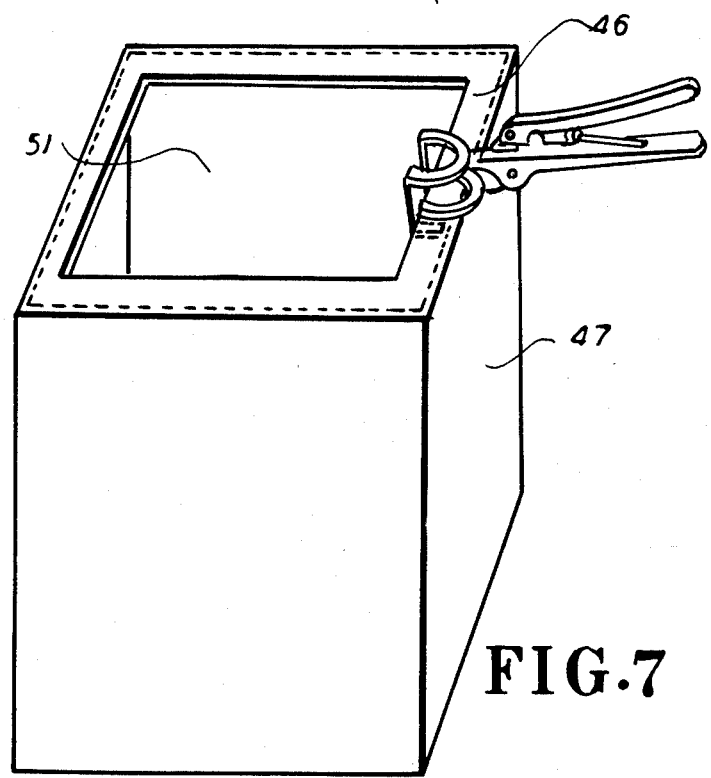
FIG. 7

INVERSE WELDING CLAMP

This invention relates to clamps which hold a work piece or portion of a work piece in place while welding or other work is being performed on the work piece. More particularly, this invention relates to clamps which engage a work piece in such a way that work can be performed on other parts of the work piece while the clamps are in position on their respective parts of the work piece. Most particularly, this invention relates to a welding clamp which engages a lip of a metal work piece such as a quarter panel of an automobile, ventilation duct, metal cabinet, and other metal constructions.

Welding clamps which hold portions of metal work pieces while welds are being applied have been known in the prior art. Examples of welding clamps of the prior art are described in U.S. Pat. Nos. 2,731,932 and 2,815,728. Both of these clamps comprise a set of upper and lower jaw elements in which at least one jaw element has an extension or extensions which meet the other jaw element or an extension from the other jaw element in such a way so as to form a clamping engagement with a work piece. Both of these clamps are particularly useful in clamping portions of automobile quarter panels while a weld is being applied to a part of the quarter panel located between the legs of the jaws of the clamp.

These clamps have a disadvantage, however, when they are used to engage what is known as a lip of an automobile quarter panel, ventilation duct, cabinet, or any other metal construction which has a lip. When these clamps engage a lip, the clamps are positioned in such a way that the handles, levers, or other members which pivotally move the jaws obstruct other areas of the quarter panel, ventilation duct, cabinet or other metal construction so that no work can be done on these areas while the clamps are engaging the lip.

It is therefore an object of the present invention to provide a welding clamp which is capable of engaging a lip of an automobile quarter panel, ventilation duct, cabinet, or other metal construction while obstructing no other areas of the metal work piece, so that other work may be done on the work piece while the clamp is being used in a welding procedure.

The clamp of the present invention comprises a handle portion and a clamping portion. In a preferred embodiment, the handle portion comprises a plurality of pivotally related members. The clamping portion comprises at least two jaw elements, comprised of an uppermost jaw element and a jaw element immediately below said uppermost jaw element. The clamping portion is actuated by said handle portion. Each jaw element comprises a first leg portion, a second leg portion, and a yoke portion. Each of the leg portions projects forwardly from the handle portion. Each jaw element is secured to the handle portion at its yoke portion. The leg portions of each jaw element extend forwardly from said handle portion. The jaw element immediately below the uppermost jaw element has flat extension members at the free ends of the leg portions. Each extension member has two flat portions, the first portion projecting upwardly from a leg of said jaw element located immediately below said uppermost jaw element to a point located above said uppermost jaw element, and the second portion being essentially perpendicular to the first portion, projecting inwardly toward said handle portion, and located above said uppermost jaw element in substantial alignment with said uppermost jaw element for clamping engagement with a work piece. In a preferred embodiment, the jaw elements are U-shaped, but other shapes of jaw elements such as a V-shape or 3 sides of a rectangle or square, may be used.

In another preferred embodiment the clamping portion consists essentially of three jaw elements, and further comprises flat extension members at the free ends of the leg portions of the jaw element immediately below the uppermost jaw element, said extension members projecting downwardly from said jaw element immediately below said uppermost jaw element and toward the lowermost jaw element, said downwardly projecting extension members and said lowermost jaw element being in substantial alignment for clamping engagement with a work piece.

In another embodiment, the pivotally related members of the handle portion consist of a pivot arm, which is pivotally related to an upper handle and a lower handle. At least the uppermost jaw element is secured to the pivot arm at the yoke portion of the jaw element, and the jaw element immediately below the uppermost jaw element is secured to the upper handle at the yoke portion of the jaw element. The invention may also include a means for adjusting the position of the pivotally related members comprising a screw in communication with the lower handle, a nut fitting around said screw, and a receptacle for receiving said screw, said receptacle being in communication with the upper handle.

FIG. 6 is a side elevational view of a clamp of the present invention clamping the lip of an automobile quarter panel;

FIG. 7 is an elevational view of a clamp of the present invention clamping the lip of a ventilation duct;

FIG. 8 is a view of a clamp of the present invention clamping the lip of a metal work piece located a short space away from another metal work piece.

Figure 1:
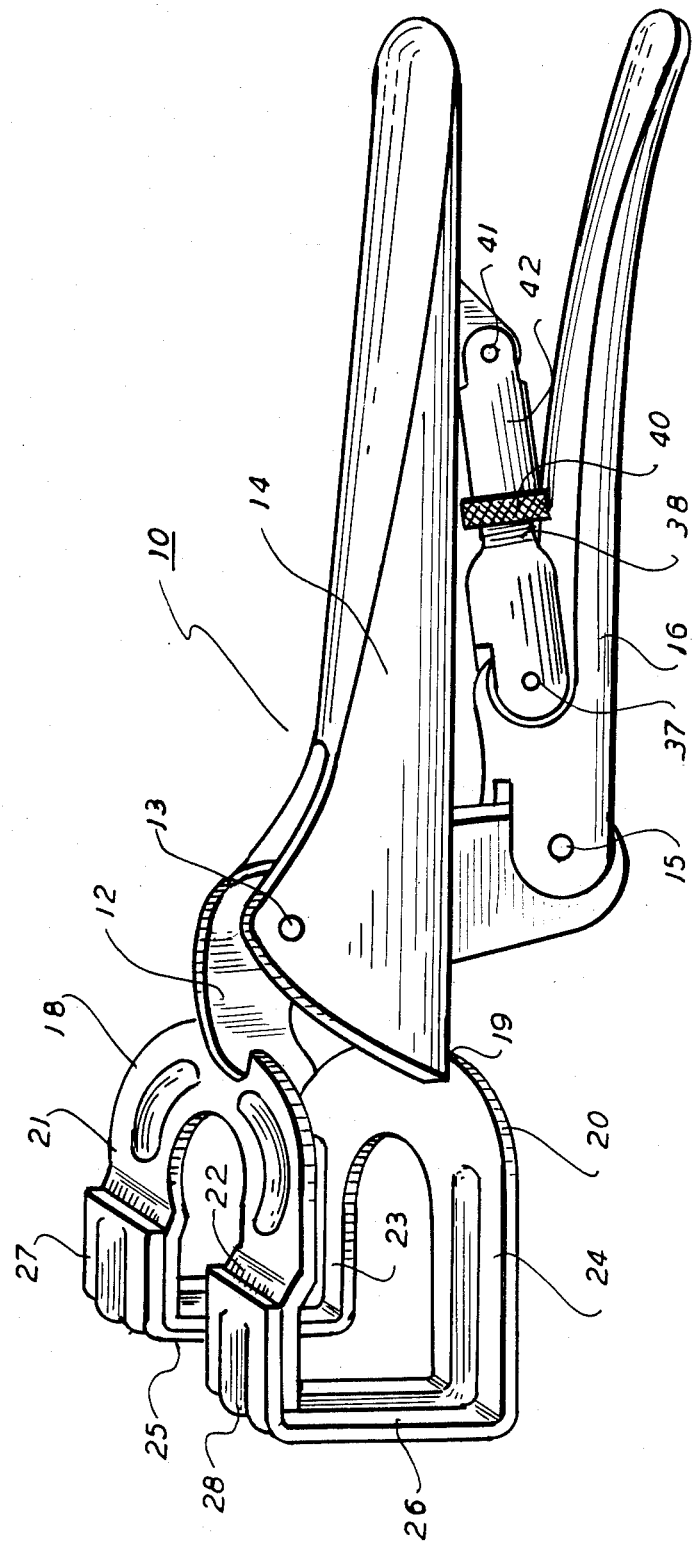
FIG. 1 is a side elevational view of an embodiment of the clamp of the present invention in the closed position.
Figure 2:
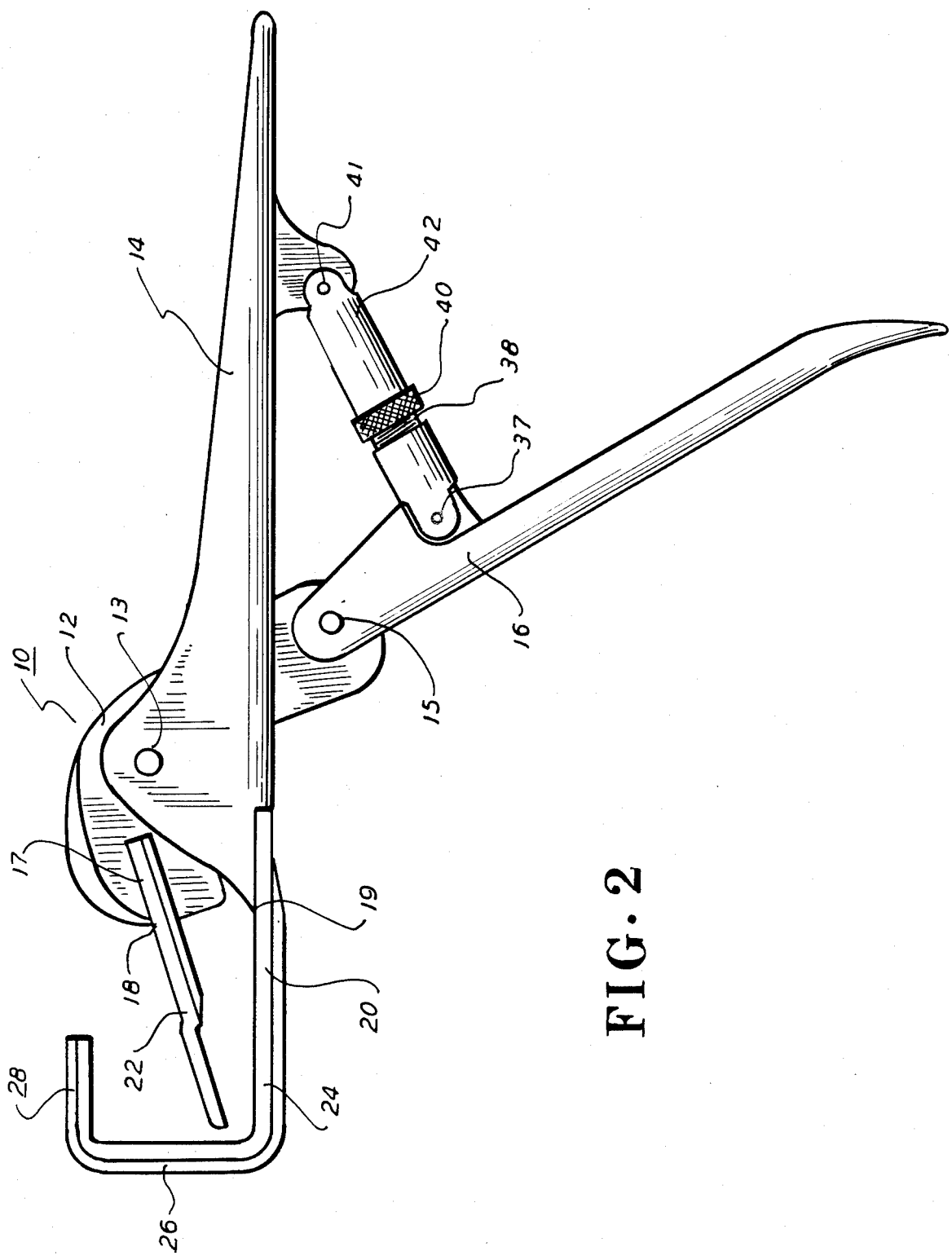
FIG. 2 is a side view of the clamp in the open position.
Figure 3:
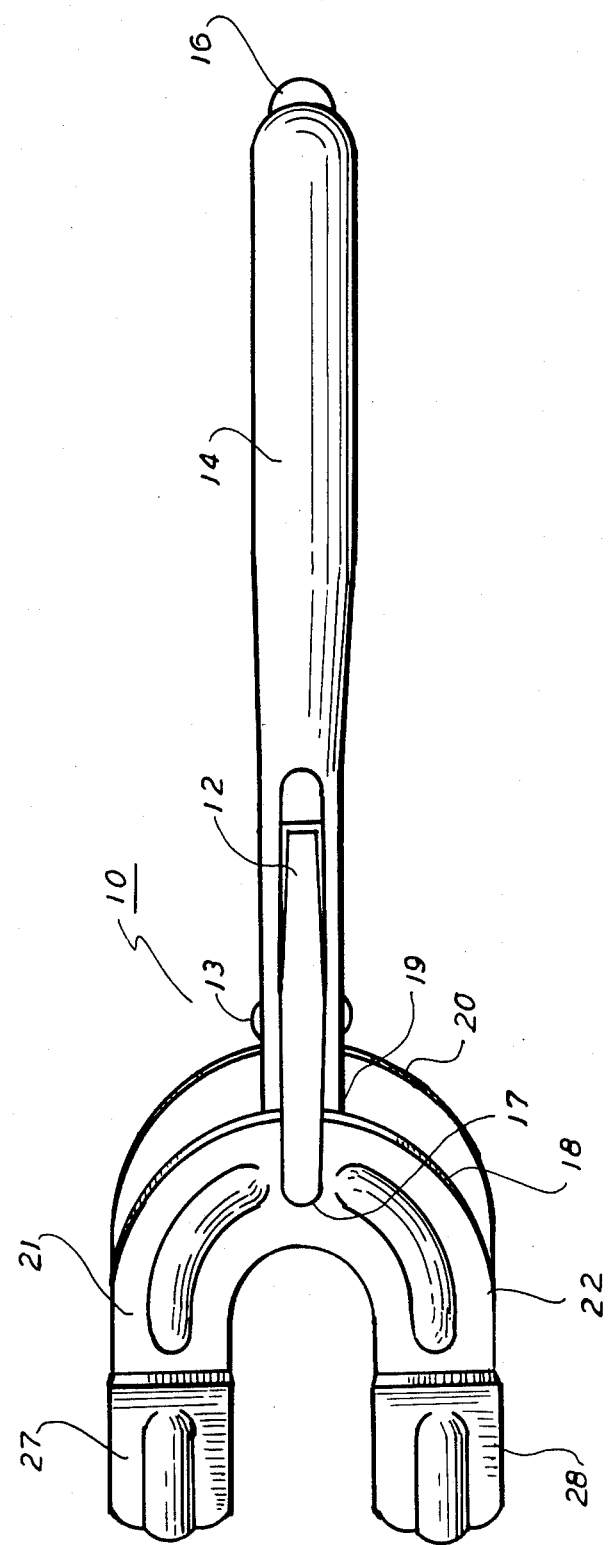
FIG. 3 is a top view of the clamp.
Figure 4:
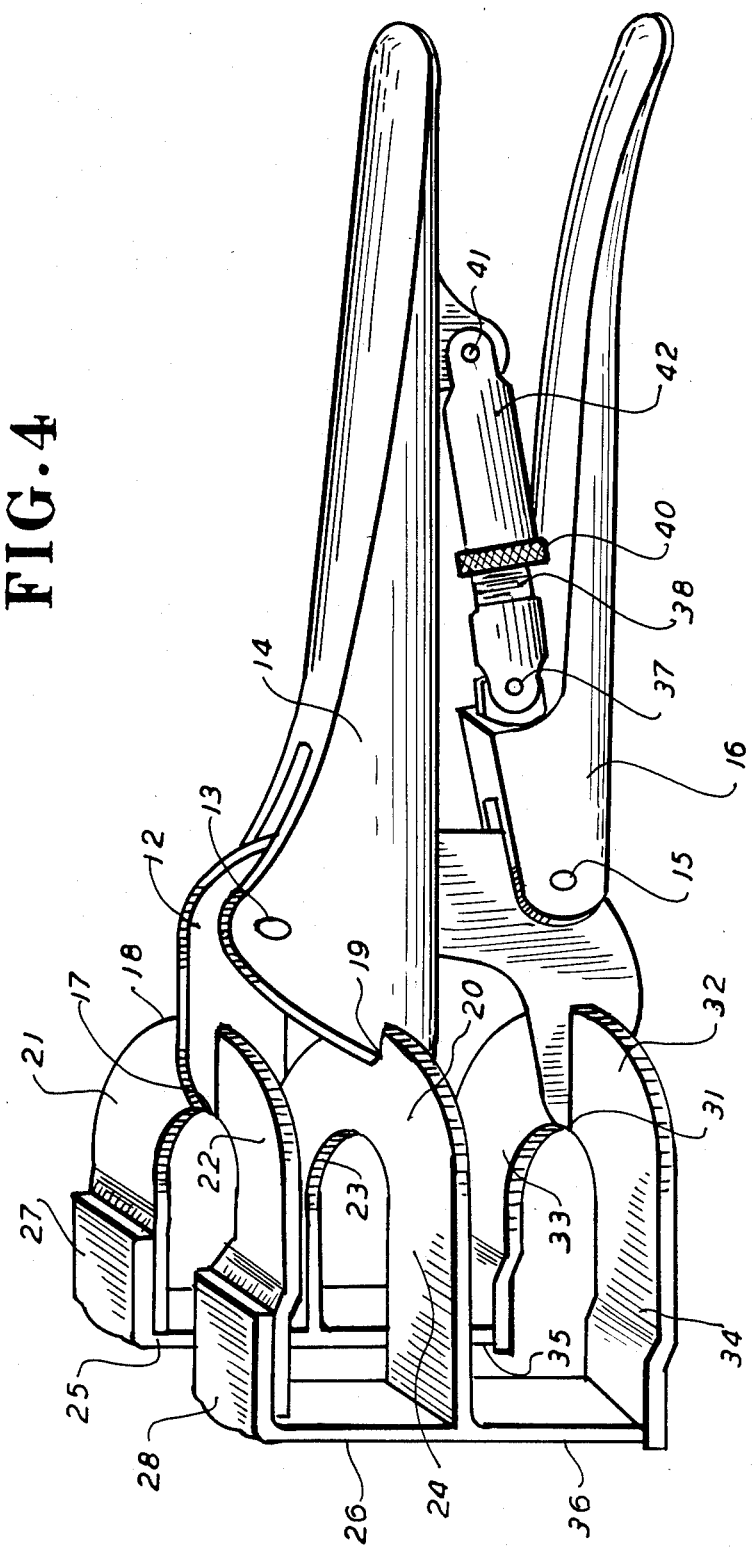
FIG. 4 is a side view of another embodiment of the clamp of the present invention in the closed position.
Figure 5:
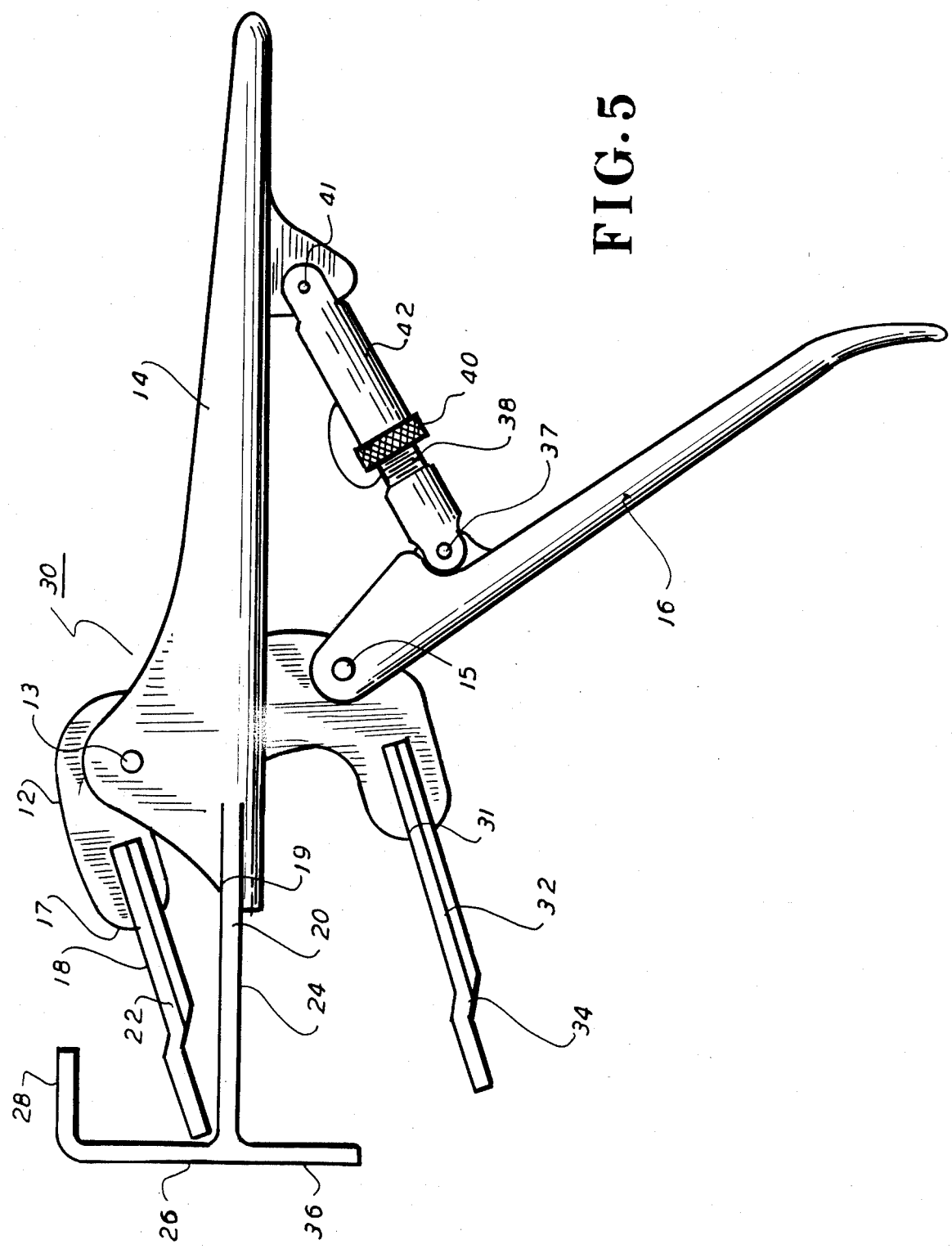
FIG. 5 is a side view of the clamp in the open position.
Figure 9:
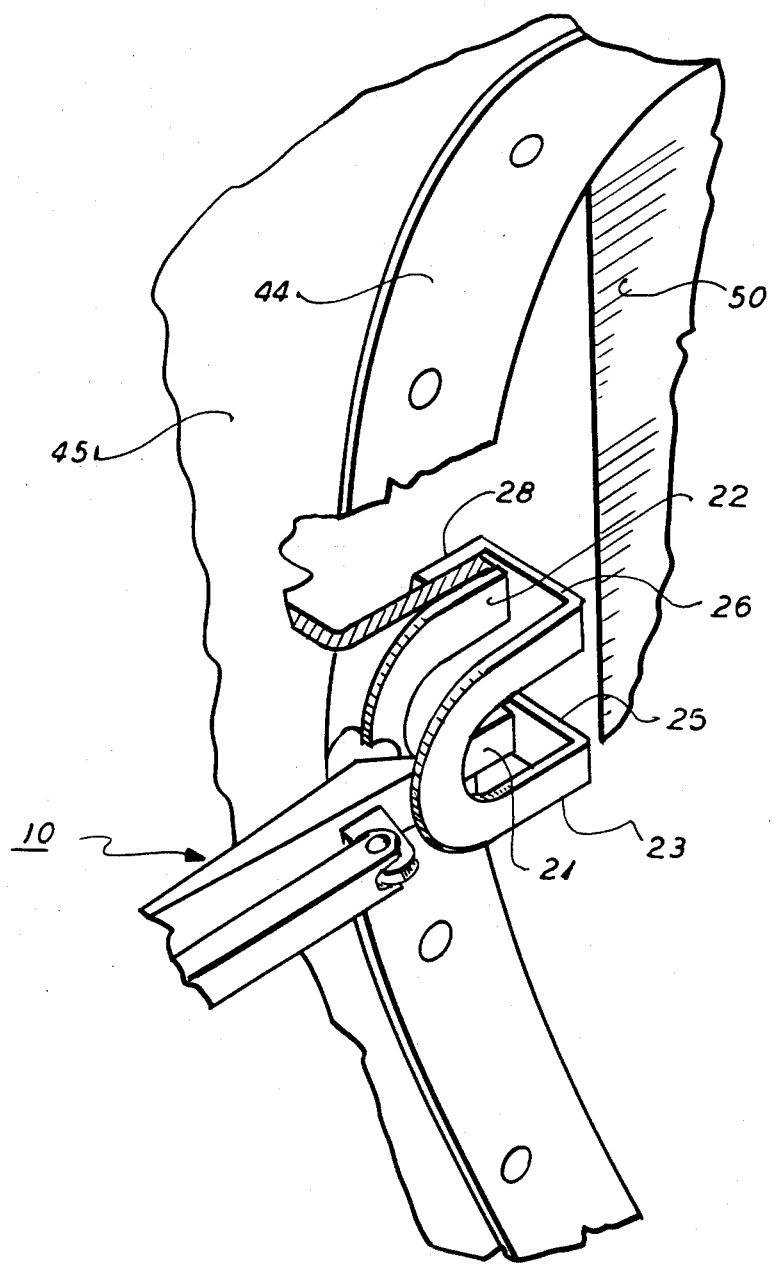
FIG. 9 is a magnified view of the clamping portion in clamping engagement with the lip of an automobile quarter panel.

Referring now to the drawings, one embodiment of the clamp 10 of the present invention comprises a handle portion, said handle portion comprised of pivotally related members shown in this embodiment in the form of a pivot arm 12, an upper handle 14, and a lower handle 16. Pivot arm 12 is pivotally attached to the upper handle 14 by pivot 13, and pivotally attached to lower handle 16 by pivot 15. The pivots may be in the form of nuts, bolts, screws, or any other means known in art. Secured to the handle portion is a clamping portion. The clamping portion is comprised of an uppermost jaw element 18 and a jaw element 20 immediately below the uppermost jaw element. Uppermost jaw element 18 is comprised of a yoke portion 17, a first leg portion 21, and a second leg portion 22. The jaw element 20 immediately below uppermost jaw element 18 is comprised of a yoke portion 19, a first leg portion 23, and a second leg portion 24. At the free ends of the legs 23, 24 of jaw element 20 are flat extension members, each extension member having two flat portions. The first portions 25, 26 of each extension member project upwardly from lower jaw element 20 to a point located above said uppermost jaw element 18. The second portions 27, 28 of each extension member are essentially perpendicular to first portions 25, 26 respectively, and are located above uppermost jaw element 18, projecting inwardly toward said handle portion and in substantial alignment with said uppermost jaw element 18 for clamping engagement with a work piece. In the embodiment as shown, the clamping engagement is provided by the alignment of second portion 27 with leg 21 and of second portion 28 with leg 22.

The clamping portion is secured to the handle portion as follows. Uppermost jaw element 18 is secured to pivot arm 12 at the yoke portion 17. Lower jaw element 20 immediately below uppermost jaw element 18 is secured to upper handle 14 at yoke portion 19. In this embodiment, jaw elements 18, 20 are shown as being U-shaped, but other shapes such as a V-shape or three sides of a rectangle or a square may also be used in accordance with this invention. Jaw elements 18, 20 may be sucured to the handle portion by soldering, welding, or other means known in the art. It is also seen that legs 21, 22, of jaw element 18, and legs 23, 24, of jaw element 20 extend forwardly from the handle portion.

Another embodiment 30 of the clamp of the present invention has three jaw elements 18, 20, 32. Uppermost jaw element 18 and jaw element 20, located immediately below uppermost jaw element 18, are constructed and secured to pivot arm 12 and upper handle 14 as described above. This embodiment 30 also includes the extensions projecting from the free end of the legs 23, 24 of jaw 20 in the form of first portions 25, 26 and second portions 27, 28 as described above. Lowermost jaw element 32 comprises a yoke portion 31, a first leg portion 33, and a second leg portion 34. Lowermost jaw element 32 is secured to pivot arm 12 at yoke portion 31. Leg portions 33, 34 project forwardly from the handle portion.

At the free ends at each of the legs 23, 24 of jaw 20 are flat extensions 35, 36. These extensions project downwardly from jaw element 20 toward lowermost jaw element 32. Extensions 35, 36 are in substantial alignment with jaw element 32 for clamping engagement with a work piece. Extension 35 is aligned with leg 33, and extension 36 is aligned with leg 34. Preferably, extensions 35, 36 and legs 33, 34 are essentially perpendicular to each other.

Also shown in the drawings is a means for adjusting the position of the pivotally related members 12, 14, and 16. This means comprises a screw 38 in communication with lower handle 16, a nut 40 fitting around side screw 38, and a receptacle 42 for screw 38 in communication with upper handle 14. Screw 38 is attached to lower handle 16 by pivot means 37, and receptacle 42 is attached to upper handle 14 by pivot means 41. These pivot means 37, 41 may be pins, screws, bolts, or any other means known in the art. To adjust the position of upper handle 14 and lower handle 16, as well as pivot arm 12, and thereby moving jaw element 18 and/or jaw element 32, one rotates nut 40 along the threads of screw 38, thereby causing screw 38 to move further into or further out of receptacle 42, thereby moving lower handle 16 on pivot 15, also causing pivot arm 12 to move on pivots 13, 15. This action causes jaw elements 18 and/or 32 to move as well, depending on which embodiment is used. In this way the clamp is opened and then closed so as to engage a portion of a work piece. It is to be understood, however, that the means for adjusting the position of the pivotally related members 12, 14, 16 and jaws 18, 32 is not limited to the specific embodiment described.

FIGS. 6 to 8 illustrate the clamp of the present invention as used to clamp the lip of a metal work piece. It can be seen that when either clamp 10 or clamp 30 is used to clamp the lip, for example lips 44, 46, 48 of an automobile quarter panel 45, ventilation duct 47, and another representative metal structure 49, respectively, space is left for other work to be done on other parts of the work piece while welding is being done. The lip 44, 46 or 48 is engaged by the second portions 27, 28 of the extension members which started at the free ends of the leg portions 23, 24 of jaw element 20, located immediately below uppermost jaw element 18, and by the leg portions 21, 22 of uppermost jaw element 18. As shown in FIGS. 6 and 7, it is seen that once the lip 44 or 46 is engaged in the method described above, the handles 14, 16 of the clamp point away from the external surface of the quarter panel 45 or insulation duct 47. This enables other work to be done on the undersurface 50 of quarter panel 45 or in the interior 51 of ventilation duct 47 while welding or other work is done on the part engaged by the clamp. This is because these areas are not obstructed by handles 14, 16 as had happened with clamps of the prior art. As in the case of a ventilation duct 47 or other conduit having a lip, more clamps can be applied to the lip and also to ducts with a smaller cross-sectional area than can be done with clamps of the prior art because the handles 14, 16 point away from the interior of the conduit.

FIG. 8 shows the lip 48 of one work piece 52 of a metal structure 49 located a short distance, for example one inch, from the wall 53 of another work piece 54 of the same metal structure 49. When lip 48 is engaged by leg portions 21, 22 of jaw 18 and by second portions 27, 28 of the extension members of the free ends of legs 23, 24 of jaw 20, handles 14, 16 point away from the space between lip 48 and wall 53. In clamps of the prior art, engagement of lip 48 would be impossible because the handles are too large to fit in the space between the lip 48 and wall 53.

Clamp 30 combines a novel feature of the clamp of this invention, the extension members from the free ends of leg portions 23, 24 of jaw 20, which consist of first portions 25, 26, and second portions 27, 28, said second portions 27, 28 aligned with leg portions 21, 22 of jaw 18 so as to form a clamping engagement with a work piece, said clamping engagement being useful in clamping metal work pieces having a lip, with extensions 35, 36 which align with legs 33, 34 of jaw 32 to form a conventional clamping engagement for applications where a conventional clamping engagement is necessary.

It is to be understood that the clamp of this invention is not limited to the specific embodiments described above. The configuration of the jaw elements may be other than that particular described. In addition, the means for adjusting the position of the pivot arm, handles, and jaws may vary. The invention may be practiced other than as particularly described and still be within the scope of the accompanying claims.

What is claimed is:

1. A clamp, comprising:
   a handle portion; and
   a clamp portion, said clamping portion being actuated by said handle portion, and said clamping portion comprising at least two jaw elements, comprised of an uppermost jaw element and a jaw element immediately below said uppermost jaw element, each jaw element comprising a first leg portion, a second leg portion, each of said leg portions projecting forwardly from said handle portion, and a yoke portion, and said jaw element immediately below said uppermost jaw element having flat extension members; each extension member having two flat portions at the free ends of each of said leg portions, the first portion projecting upwardly from a leg of said jaw element located immediately below said uppermost jaw element to a point located above said uppermost jaw element, and the second portion being essentially perpendicular to said first portion, said second portion projecting inwardly toward said handle portion and located above said uppermost jaw element for clamping engagement with a work piece, and said jaw elements secured to said handle portion at the yoke portions of said jaw elements.

2. The clamp of claim 1 wherein said jaw elements are substantially U-shaped.

3. The clamp of claim 1 wherein said clamping portion consists essentially of three jaw elements, and further comprising flat extension members at the free ends of the leg portions of the jaw element immediately below the uppermost jaw element, said extension members projecting downwardly from said jaw element immediately below said uppermost jaw element and toward the lowermost jaw element, said downwardly projecting extension members and said lowermost jaw element being in substantial alignment for clamping engagement with a work piece.

4. The clamp of claim 1 wherein said handle portion comprises a plurality of pivotally related members.

5. The clamp of claim 4 wherein said pivotally related members consist essentially of a pivot arm, an upper handle, and a lower handle, said pivot arm being pivotally attached to said upper handle and said lower handle and being secured to at least the uppermost jaw element, and said upper handle being secured to the jaw element immediately below said uppermost jaw element.

6. The clamp of claim 5, and further comprising means for adjusting the position of said pivotally related members comprising:
   a screw in communication with said lower handle;
   an nut fitting around said screw; and
   a receptacle for receiving said screw, said receptacle being in communication with said upper handle.

* * * * *